United States Patent
Ukechi et al.

(10) Patent No.: US 6,739,762 B2
(45) Date of Patent: May 25, 2004

(54) OPTICAL DEVICE PACKAGE

(75) Inventors: Mitsuo Ukechi, Tokyo (JP); Ryoji Kaku, Tokyo (JP); Keiichi Mori, Tokyo (JP); Takao Mase, Tokyo (JP); Ayumi Takahashi, Tokyo (JP); Osamu Imaki, Tokyo (JP); Yoshichika Kato, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/033,939

(22) Filed: Dec. 18, 2001

(65) Prior Publication Data

US 2002/0085817 A1 Jul. 4, 2002

(30) Foreign Application Priority Data

Dec. 26, 2000 (JP) ........................ 2000-395646

(51) Int. Cl.⁷ ................................ G02B 6/42
(52) U.S. Cl. ......................... 385/89; 385/92
(58) Field of Search .................. 385/92–94, 89, 385/73, 16–23

(56) References Cited

U.S. PATENT DOCUMENTS 5,757,993 A * 5/1998 Abe .......................... 385/34
6,220,764 B1 4/2001 Kato et al.
6,238,100 B1 * 5/2001 Sasaki et al. .................. 385/59
6,461,058 B1 * 10/2002 Birch et al. .................... 385/92

FOREIGN PATENT DOCUMENTS

| JP | 04330788 | 11/1992 |
| JP | 07318764 | 12/1995 |
| JP | 09304660 | 11/1997 |
| JP | 11287927 | 10/1999 |
| JP | 200075169 | 3/2000 |
| WO | WO9845741 | 10/1998 |

OTHER PUBLICATIONS

Understanding Fiber Optics by Jeff Hecht, 1987, pp. 53,64–69 and 403–404.*

* cited by examiner

Primary Examiner—Akm Enayet Ullah
Assistant Examiner—Jerry T Rahll
(74) Attorney, Agent, or Firm—Gallagher & Lathrop; David N. Lathrop, Esq.

(57) ABSTRACT

In a substrate carrying optical devices housed in a case, there are formed positioning parts for defining the positions of optical axes of the optical devices. Flexible optical waveguides are provided which are fixedly held at one end in the positioning parts and connected at the other end to an optical connector ferrule mounted in the case, and deviations from proper alignment between the optical axes of the optical devices and the axes of optical fiber receiving holes of the optical connector ferrule are accommodated by deformation of the flexible optical waveguides.

6 Claims, 7 Drawing Sheets

OPTICAL DEVICE PACKAGE

BACKGROUND OF THE INVENTION

The present invention relates to an optical device package of the type that houses various optical devices in a case and leads them off the case through optical fibers optically coupled therewith for external connection and, more particularly, to an optical device package that permits optical coupling of optical devices and fibers without involving their relative positioning to place their optical axes in accurate alignment.

Figure 1:
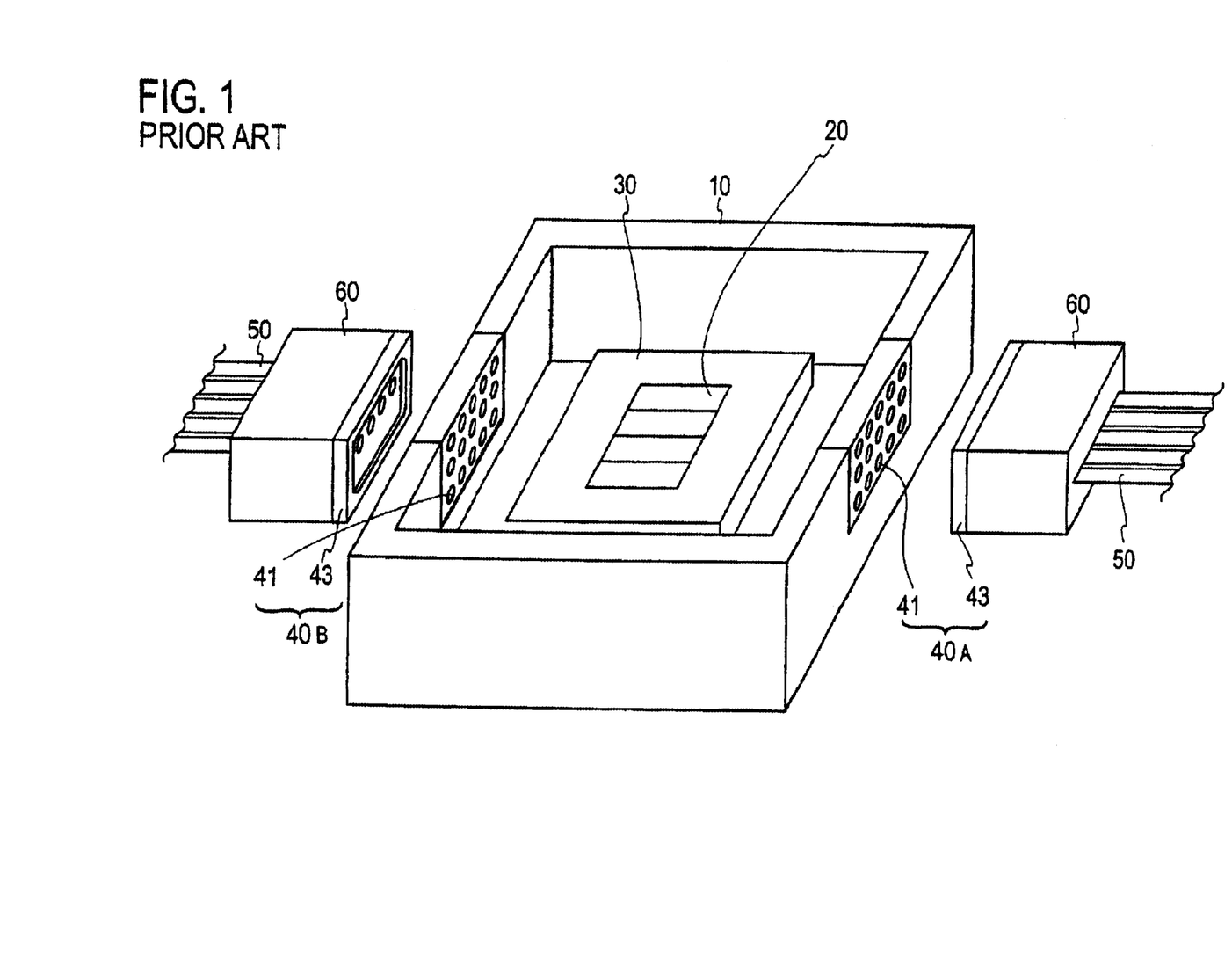
FIG. 1 is a perspective view of a prior art example.

FIG. 1 depicts the construction of a conventional optical device package. Reference numeral 10 denotes a case; 20 denotes optical devices; 30 denotes a substrate with the optical devices 20 mounted thereon, 40a, 40b denotes lens array panels mounted in opposite sidewalls of the case 10 and each having plural lens arrays 41 arranged in plural columns, 43 denotes spacers; 50 denotes single-mode optical fibers arranged in a tape-like form in this example, and 60a, 60b denotes optical connector ferrules attached to end portions of the optical fibers 50.

The substrate 30 is usually a semiconductor substrate, on which the optical devices are mounted. The optical devices that can be housed in the case 10 are, for example, optical switches, light emitting elements, light receiving elements, and so forth.

Figure 2:
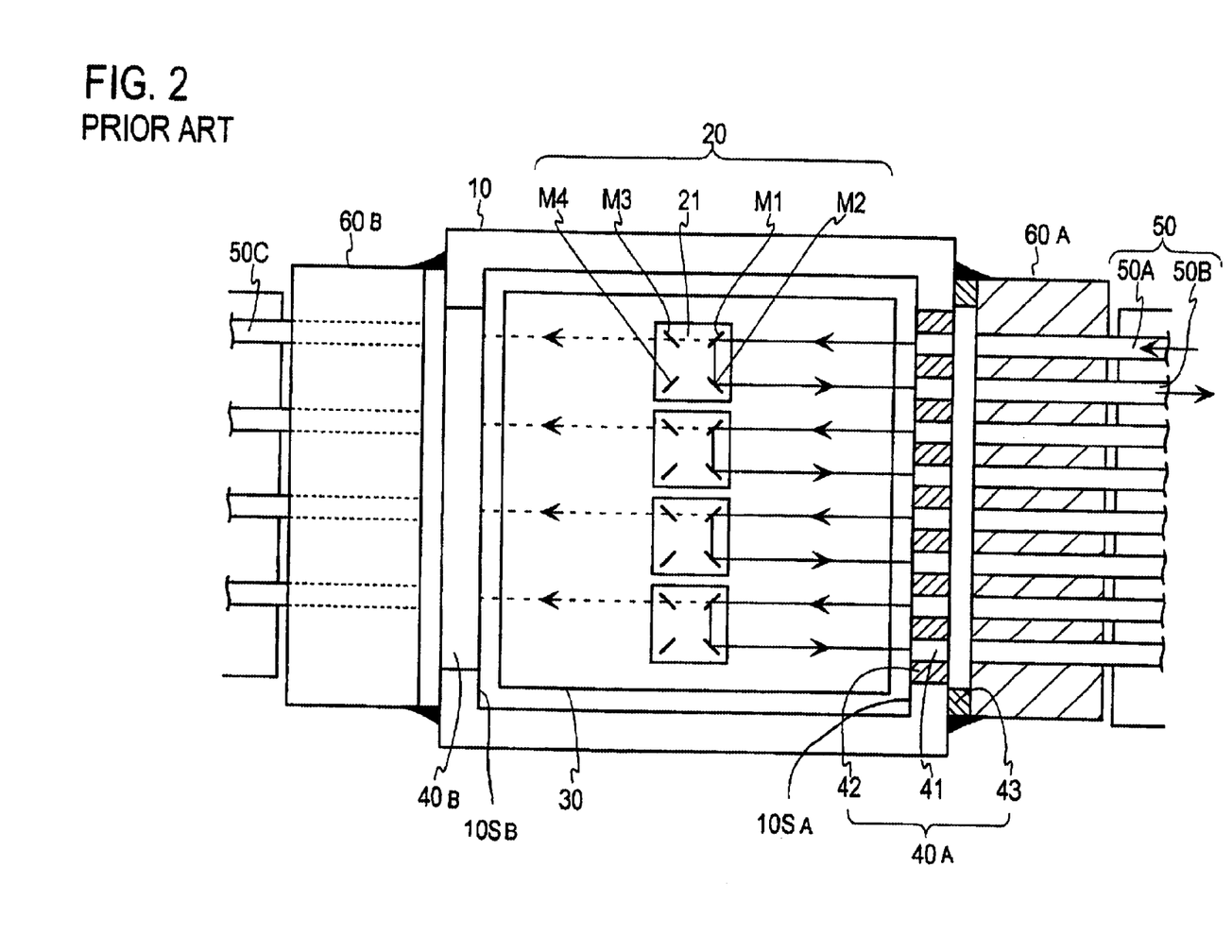
FIG. 2 is its magnified plan view.

Turning now to FIG. 2, a brief description will be given of an optical path configuration in the case where optical switches 20 are housed in the case 10. FIG. 2 is a diagrammatic showing of the optical switch structure. The substrate 30 has formed in its top surface a depression (not shown) of the same depth over the entire area thereof, in which hinge-supported vertically moving plates 21 are placed as shown. Mounted on each vertically moving plate 21 are mirrors M1, M2, M3 and M4, which are disposed with their reflecting surfaces tilted at 45 degrees to the optical axes of the lenses 41a held in the lens array panel 40a, 40a. With voltage application to electrodes formed on the vertically moving plate 21 and the substrate 30, the plate 21 moves down vertically to its surface due to electrostatic attractive force, bringing down the mirrors M1, M2, M3 and M4 and held at the down position.

In this example, the optical switch 20 switches between the state in which the plate 21 is in the up position where the mirrors M1 and M2 reflect incident light from an optical fiber 50A for transfer to an optical fiber 50B and the state in which the plate 21 is in the down position where the incident light from the optical fiber 50A passes over the mirror M1, then impinges on and is focused by the corresponding one of the lenses 41b (not shown) of the lens array panel 40b on the side opposite the optical fiber 50A and the focused light is launched into an optical fiber 50C. FIG. 2 shows the case where four such optical switches are housed in the case 10. For details of this optical switch, refer to Japanese Patent Application Laid-Open Gazette 2000-121967.

The optical fiber 50 is a well-known single-mode optical fiber. The lenses 41 of the lens array panel 40a, 40b are optical fiber segments obtained by cutting, for example, a graded index optical fiber short and inserted in lens receiving holes made through a lens holding plate 42.

In the lens array panel 40 there are mounted plural lens arrays arranged in columns. The optical connector ferrule 60a, 60b is held at such a position that it is aligned with that of the lens arrays which is in alignment with the optical axes of the optical devices 20. This brings the optical axes of the optical fibers 50 into alignment with the optical axes of the optical devices 20 housed in the case. Thereafter, the optical connector ferrule 60a, 60b is bonded to the case 10.

The conventional optical device package has the construction in which the optical axes of the optical fibers 50 supported to the optical connector ferrule 60a, 60b are optically coupled to the optical devices 20 through the lens array 40a, 40b mounted in the sidewalls 10Sa, 10Sb of the case 10. Hence, when the optical connector ferrule 60a, 60b is attached to the case 10, much time is required to make adjustments for bringing the optical axes of each optical fiber 50 held by the optical connector ferrule 60a, 60b into alignment with the optical axis of the corresponding lens 41 of the lens array 40a, 40b. This seriously impairs the productivity of the optical device package.

Moreover, it is also troublesome and time-consuming to make adjustments for placing the optical axes of the lenses 41 of the lens array 40a, 40b and the optical devices 20 in alignment with each other.

SUMMARY OF THE INVENTION

It is therefore an object of the present invention to provide an optical device package that is free from the necessity for the positioning and hence is easy to fabricate.

The optical device package according to an aspect of the present invention comprises:

a substrate having mounted on its one side optical devices and having formed in said one side positioning parts for defining the positions of optical axes of the optical devices;

a case with the substrate housed therein;

an optical connector ferrule mounted in the case;

flexible optical waveguides held at one end in optical fiber receiving holes made in the optical connector ferrule and having the other ends extended into the case and positioned in the positioning parts to provide optical coupling between the flexible optical waveguides and the optical devices; and a ferrule coupler provided on the end face of the optical connector ferrule externally of the case, for optically coupling optical fibers held in another optical connector ferrule to the flexible optical waveguides.

According to another aspect of the invention, the substrate is a semiconductor substrate and the positioning parts are V grooves cut in the semiconductor substrate in parallel to the optical axes of the optical devices.

According to another aspect of the invention, the flexible optical waveguides are each formed by a graded index optical fiber that focuses light emitted therefrom.

According to another aspect of the invention, the flexible optical waveguides are each formed by a TEC optical fiber that focuses light emitted therefrom.

According to another aspect of the invention, the ferrule coupler comprises pins projecting from one of the optical connector ferrules and pin receiving holes made in the other optical connector ferrule.

According to still another aspect of the invention, misalignments between the optical axes of the optical devices and the axes of the optical fiber receiving holes of the optical connector ferrule and their misorientations are accommodated by deforming the flexible optical waveguides.

With the optical device package structure of the present invention, the optical devices and the optical connector ferrule mounted in either of opposite sidewalls of the case are interconnected by flexible optical waveguides, and end portions of the flexible optical waveguides are positioned by the positioning parts formed on the part of the optical devices to provide optical coupling between the flexible optical waveguides and the optical devices. Hence, the positioning can be accomplished simply by placing and fixing the end portions of the flexible optical waveguides in the positioning parts—this permits easy fabrication of optical device packages.

Further, since each optical connector ferrule mounted in one sidewall of the case is provided with an optical connector ferrule coupler, another optical connector ferrule having connected thereto is automatically positioned relative to and connected to the optical connector ferrule mounted in the sidewall of the case. Accordingly, the present invention allows assembling of the optical device package without involving the positioning, and hence it permits easy assembling and fabrication of optical device packages with increased productivity.

DETAILED DESCRIPTION OF THE PREFERRED EMBODIMENTS

Figure 3:
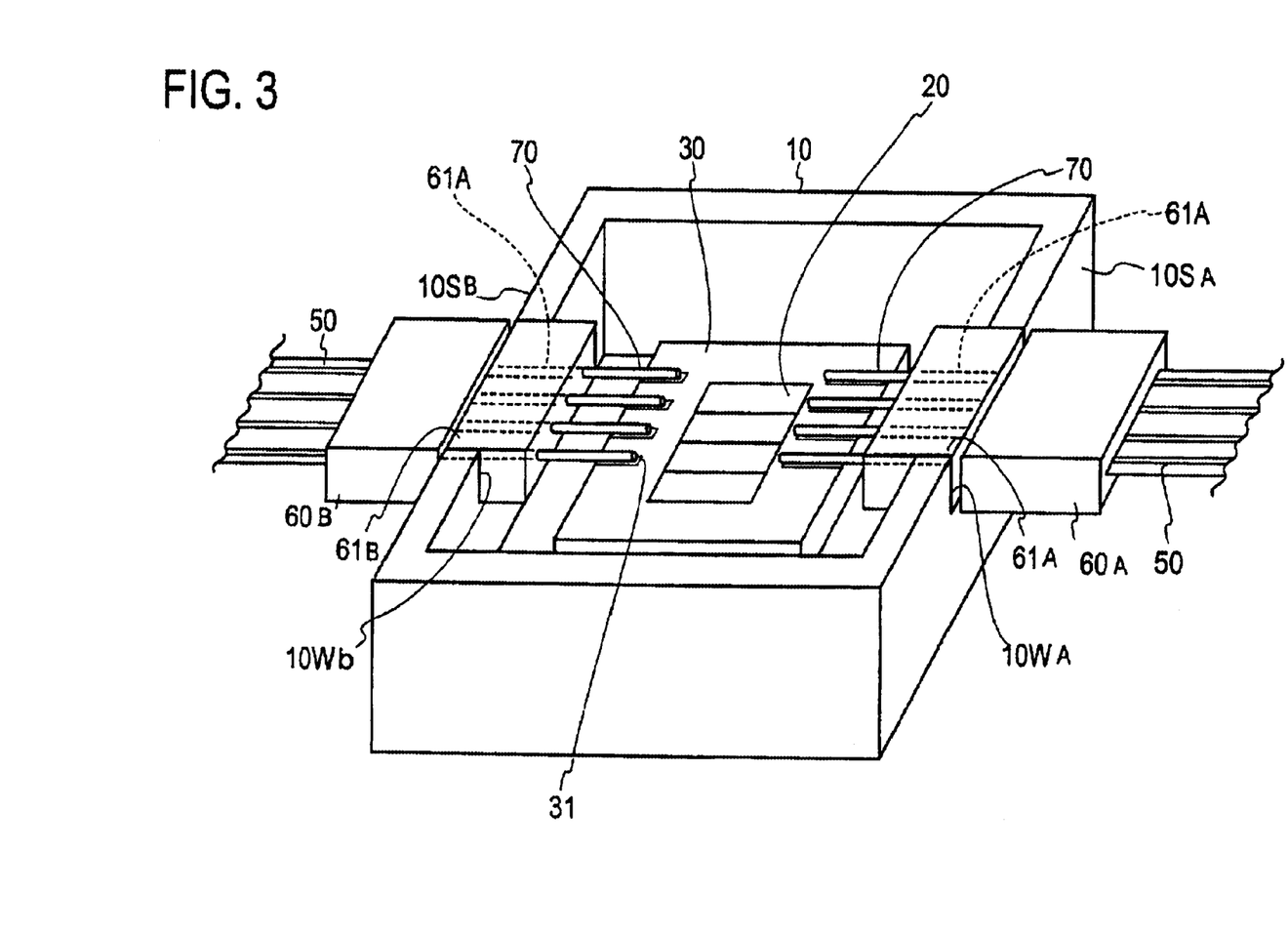
FIG. 3 is a perspective view of an embodiment of the optical device package according to the present invention.

In FIG. 3 there is illustrates an embodiment of the optical device package according to the present invention including optical switches as the optical devices. The parts corresponding to those in FIGS. 1 and 2 are identified by the same reference numerals.

Reference numeral 61 denotes optical connector ferrules newly provided according to the present invention. The optical connector ferrules 61a, 61b each have a construction in which optical fiber receiving holes 61A extending through a block member from one end face to the other perpendicularly thereto are arranged in parallel, equally spaced relation and pins 81 for positioning relative to the mating connector ferrule 60a, 60b are planted on the outer end face of the block member outside the arrangement of the optical fiber receiving holes 61A. The optical connector ferrules 61a, 61b are fitted in windows 10Wa, 10Wb formed in two opposite sidewalls 10Sa, 10Sb of the case 10 with the center axes of the optical fiber receiving holes 61A held perpendicular to the sidewall surfaces.

Figure 4:
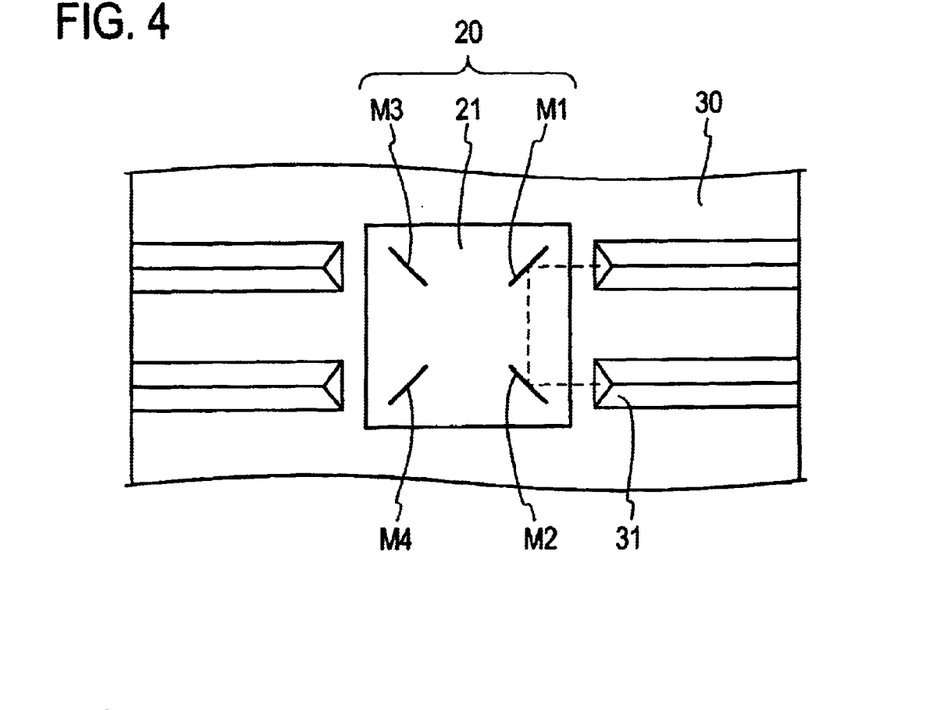
FIG. 4 is a plan view of the principal part of the FIG. 3 embodiment.
Figure 5:
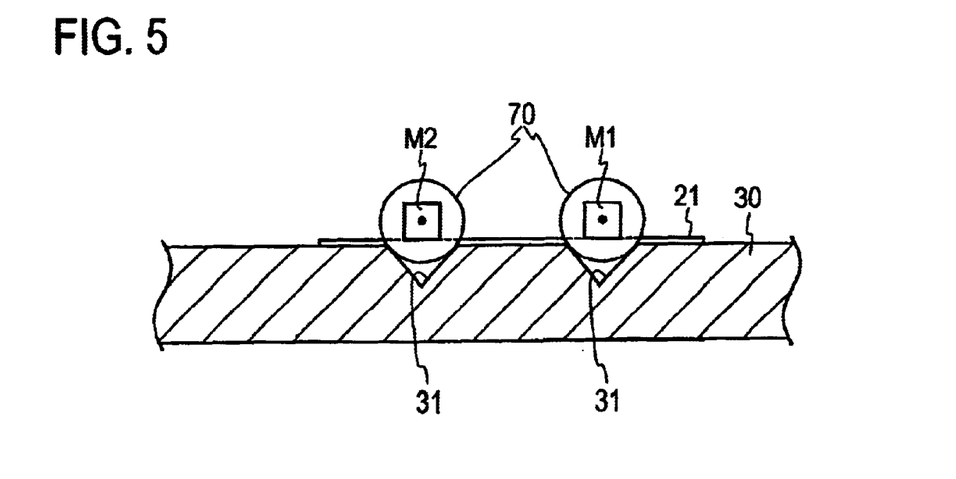
FIG. 5 is a magnified cross-sectional view of the principal part shown in FIG. 4.

Reference numeral 31 denotes positioning parts formed in the substrate 30 for defining the positions of the optical axes of the optical devices 20. The positioning parts 31 may be V-shaped grooves cut in the substrate 30 so that they extend in parallel to the optical axes of the optical devices 20 as depicted in FIGS. 4 and 5. The V-shaped grooves 31 can be formed with high accuracy by photolithography in the manufacture of the optical devices 20.

The present invention incorporates a structural feature that flexible optical waveguides 70 connected at one end to either optical connector ferrule 61a, 61b have their other ends held in the positioning grooves 31. The flexible optical waveguides 70 may be formed by graded index or TEC optical fibers, for instance.

Figure 6:
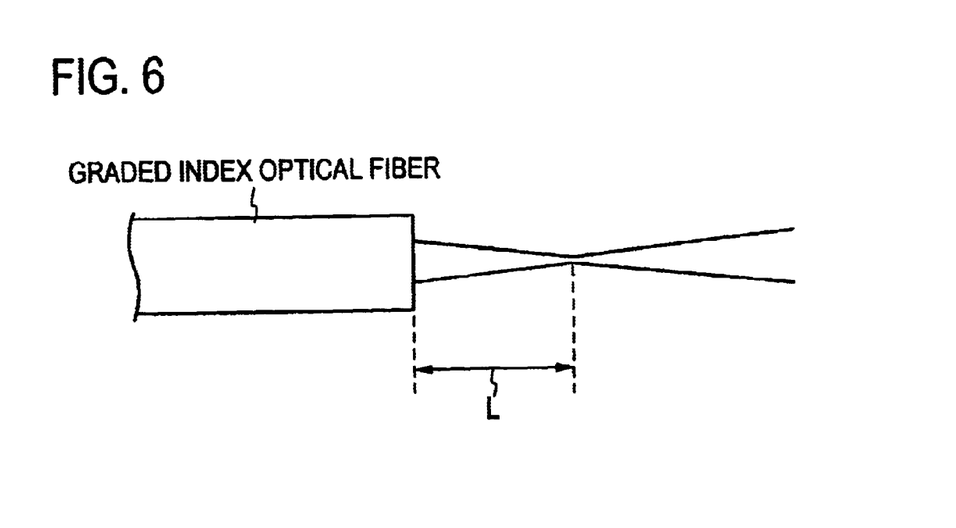
FIG. 6 is a side view for explaining an example of a flexible optical waveguide for use in the present invention.

The graded index optical fiber refers to an optical fiber which has no interface between the core and the cladding and whose refractive index increases smoothly toward the center axis of the fiber in its radial direction. Accordingly, light having passed through the graded index optical fiber comes into a focus after traveling a certain distance L as depicted in FIG. 6. As is well-known in the art, advantage is taken of the graded-index property by cutting the graded index optical fiber into short segments for use as lenses.

Figure 7:
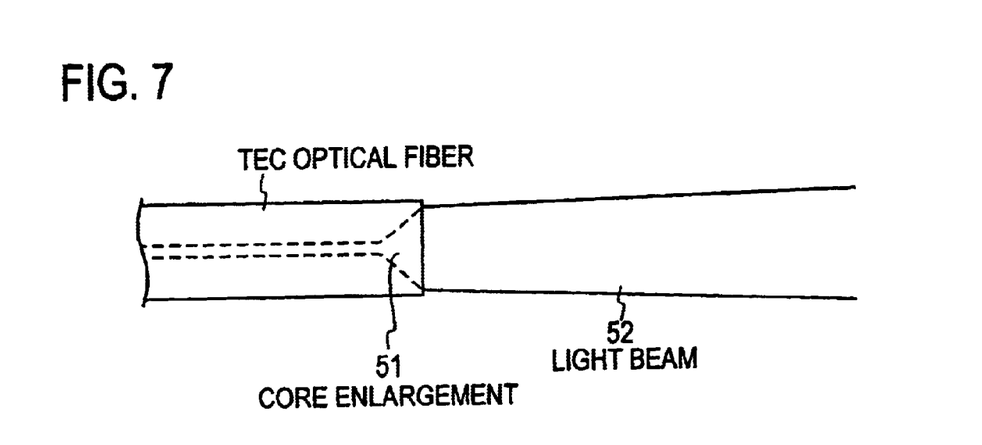
FIG. 7 is a side view similar to FIG. 4.

The TEC optical fiber has, as depicted in FIG. 7, a core enlargement 51 in its cross-section, from which light is emitted in the form of a thick beam as indicated by 52. The light beam 52 travels without wide divergence.

Figure 8:
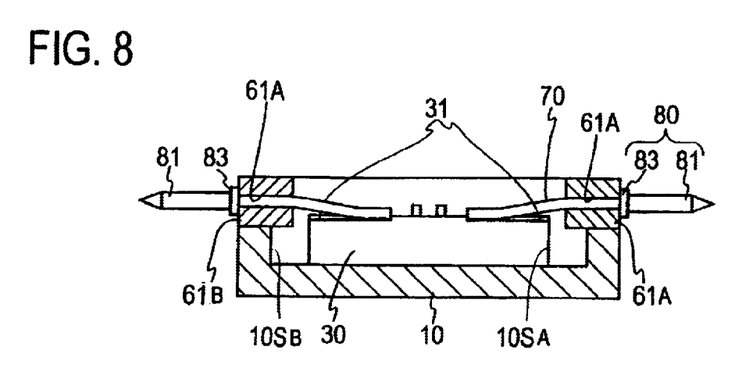
FIG. 8 is a sectional view for explaining the operational effect of the present invention.

These optical fibers are formed so thin by drawing glass that they are flexible. Through utilization of this flexibility of optical fibers, the present invention solves the problems that are caused by relative displacement of the optical axis of each optical device 20 to the axis of the corresponding optical fiber receiving hole 61A of the optical connector ferrule 61a, 61b and displacement out of axial alignment of the axes of the optical fiber receiving holes 61A with the optical axes of the optical devices 20. That is, the flexible optical waveguides 70 are firmly received at one end in the optical fiber receiving holes 61A of the optical connector ferrule 61a, 61b and held at the other ends in the positioning grooves 31 of the substrate 30 to establish alignments between optical axes of the optical waveguides 70 and the optical devices 20 as shown. This accommodates positional displacements between the optical axes of the optical devices 20 and the axes of the optical fiber receiving holes 61A of the optical connector ferrule 61a, 61b, ensuring optical coupling of the optical devices 20 and the optical connector ferrules 61 in proper alignment with each other. FIG. 8 shows the case where the optical axis of the optical device 20 is displaced a little under the axes of the opposite optical fiber receiving holes of the optical connector ferrules 61a, 61b. Such a situation occasionally arises from nonuniformity in the thickness of the substrate 30. In this instance, one end of each flexible optical waveguide 70 is inserted and held in the corresponding fiber receiving hole of the optical connector ferrule 61a, 61b and the free end portion of the waveguide 70 is positioned in the positioning groove 31 and fixed (by adhesive) to the substrate 30 with the intermediate portion of the flexible optical waveguide 70 slightly deformed. However, the optical connector ferrule 61 and the optical device 20 are optically coupled in alignment with each other.

Accordingly, even if the optical axis of each optical device 20 and the axis of each optical fiber receiving hole of the optical connector ferrule 61 somewhat deviate in height from each other due to nonuniformity in the thickness of the substrate 30, the deformation of the flexible optical waveguide 70 accommodates the deviation, ensuring optical coupling of the optical connector ferrule 61 and the optical device 20 held in alignment with each other.

Further, in this embodiment the optical connector ferrule 60a, 60b having connected thereto the single-mode optical fibers 50 and the optical connector ferrule 61a, 61b are coupled together by means of a coupler 80.

Figure 9:
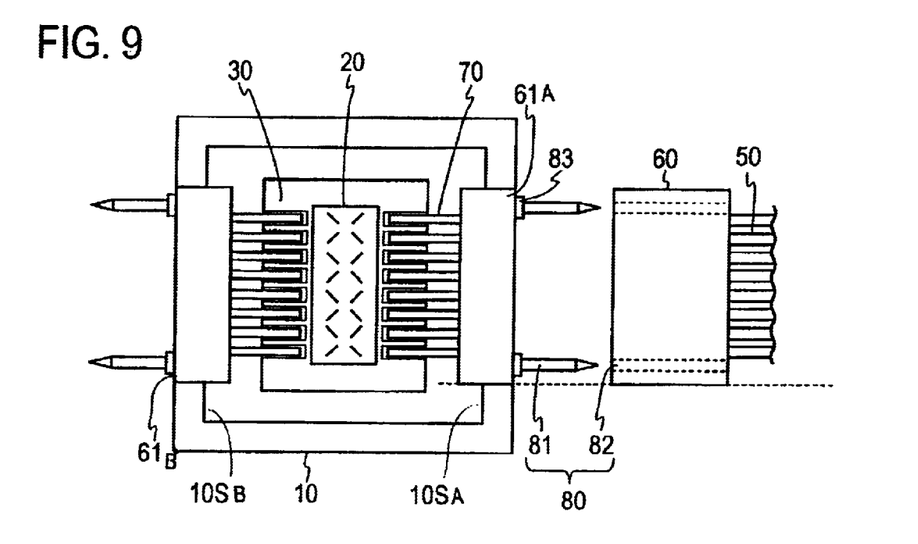
FIG. 9 is a plan view explanatory of an example of a ferrule coupler for use in the present invention.

FIG. 9 shows an example of the coupler 80. Reference numeral 81 denotes positioning pins 81 disposed on the end face of the optical connector ferrule 61 at opposite sides in the direction of arrangement of the optical fibers 50. The pins 81 are inserted into pin receiving holes 82 made in the end face of the mating optical connector ferrule 60a, 60b. Thus, the optical ferrules 61a, 61b and 60a, 60b are coupled in relatively positioned state (in which the axes of their optical fiber receiving holes are aligned with each other).

Incidentally, the optical connector ferrules 61a, 61b and 60a, 60b need to be separated by a gap for optical coupling of the flexible optical waveguides 70 and the single-mode optical fibers 50. To this end, a spacer 83 of a proper thickness is put on each of the pins 81 to provide a gap of a desired size between the optical fibers 50 and the flexible optical waveguides 70.

The optical connector ferrules 60a, 60b and 61a, 61b thus coupled together are bonded to each other, by which is obtained a package with the optical fibers 50 led off the case 10. A user needs only to connect his desired device to the ends of the optical fibers 50 to utilize the optical devices 20 housed in the case 10.

Figure 10:
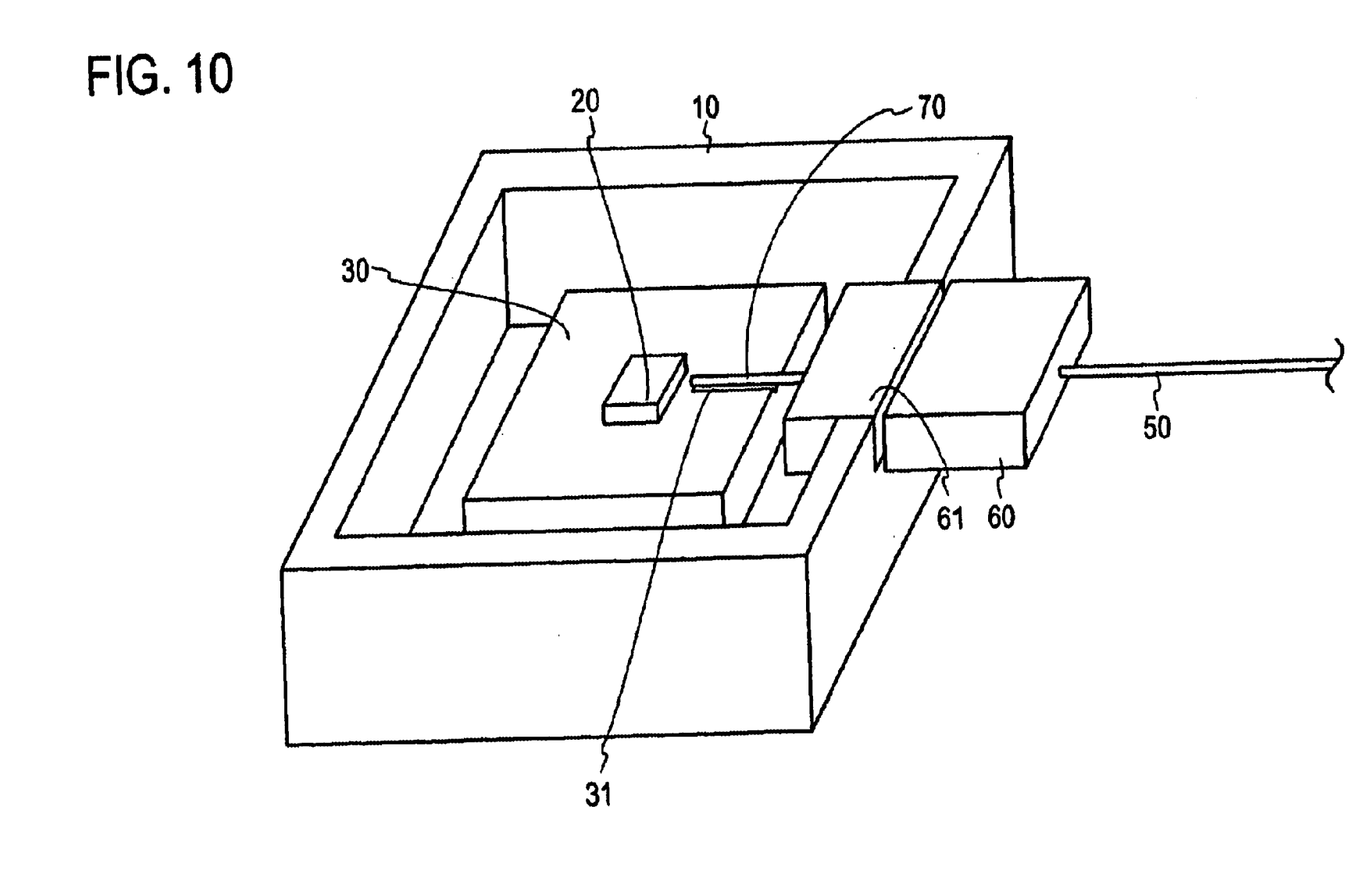
FIG. 10 is a perspective view of a modified form of the present invention.

While in the above the present invention has been described as being applied to the optical device package in which pluralities of optical fibers 50 and flexible optical waveguides 70 are connected to the optical connector ferrules 60a, 60b and 61a, 60b the invention is applicable as well to such a package structure as shown in FIG. 10 which uses a single optical fiber 50 and a single flexible optical waveguide 70. This package structure is used when the optical device 20 is a light emitting element or light receiving element.

Further, while in FIG. 9 the ferrule coupler 80 is shown to have the positioning pins 81 provided on the part of the optical connector ferrule 61a, 61b, it will easily be understood that the same results as mentioned above could be obtained even if the pins are provided on the part of the ferrule 60a, 60b

Effect of the Invention

As described above, according to the present invention, even if the optical axes of the optical devices 20 placed in the case 10 and the optical connector ferrule 61a, 61b are misaligned, deformation of the flexible optical waveguides int3erconnecitng them accommodates the misalignment, ensuring optical coupling of the optical devices 20 and the optical connector ferrule 61a, 61b held in alignment with each other. This permits assembling of the optical device package without involving any steps of alignment, and hence allows assembling of many packages in a short time.

Moreover, in the case of the single-mode optical fibers 50 are connected to the flexible optical waveguides 70 in the case 10, no positioning is needed, either, since the ferrules 60a, and 61a, 60b and 61b are coupled together by the coupler 80.

Furthermore, according to the present invention, since the flexible optical waveguides 70 and the optical devices 20 are positioned relative to each other by the positioning parts 31, and since the ferrules 60a and 61a, 60b and 61b are also positioned relative to each other, optical device packages can be produced with the same optical coupling between the optical devices 20 and the single-mode optical fibers 50.

Accordingly, the present invention provides optical device packages that are easy to assemble and have uniform characteristics, and hence the invention is of great utility when put to practical use.

The above description has been given of the case where the optical axes of the optical devices 20 and the axes of the optical fiber receiving holes 61A of the optical connector ferrule 61a, 61b deviate in the vertical direction, but also in the case where the pitch of arrangement of the optical devices 20 and the pitch of arrangement of the optical fiber receiving holes of the optical connector ferrule 61a, 61b differ in a horizontal plane, the use of the present invention permits optical coupling of them.

What is claimed is:

1. An optical device package comprising:
    a substrate having mounted on its one side optical devices and having formed in said one side positioning parts for defining the positions of optical axes of said optical devices, each said optical device having plural pairs of ports for externally receiving/delivering light beams on both sides thereof opposite to each other, said positioning parts being formed in plural pairs therewith, and each said positioning part in each pair being provided to correspond to each said port of each pair of each said optical device;
    a case with said substrate housed therein;
    two optical connector ferrules fitted in windows formed in two opposite sidewalls of said case;
    flexible optical waveguides having one ends held in optical fiber receiving holes formed in said optical two connector ferrules and extended at the other ends into said case and positioned in said positioning parts to define positions of optical axes of said flexible optical waveguides in alignment with the corresponding ports of said optical devices; and
    two ferrule couplers provided on end faces of said two optical connector ferrules externally exposed out of said case, for optically coupling externally connecting optical fibers held in two externally connecting optical connector ferrules to said flexible optical waveguides held by the corresponding optical connector ferrules,
    whereby any pair of the optical fibers held in said two externally connecting optical connector ferrules are coupled together by means of the flexible optical waveguides without adjusting offset in alignment of the axes of the pair of the optical fibers.

2. The optical device package according to claim 1, wherein
    said externally connecting optical fibers are single-mode optical fibers, and
    the externally connecting optical connector ferrule and the optical connector ferrule are bonded together,
    whereby the optical devices housed in the case can be accessed only by connecting external device to the single-mode optical fiber led from the optical device package.

3. The optical device package according to claim 2, wherein
    said optical devices are optical switches, whereby the optical device package acts as an optical switch package.

4. The optical device package according to claim 1, wherein
    the two ports in each pair for each said optical device are provided on opposite sides of the optical device, and the other ends of the flexible optical waveguides held in the two ports in each pair are oppositely provided to each other so that they are optically coupled together when the optical device positioned therebetween is offset.

5. The optical device package according to claim 4, wherein said externally connecting optical fibers are single-mode optical fibers, and the externally connecting optical connector ferrule and the optical connector ferrule are bonded together, whereby the optical devices housed in the case can be accessed only by connecting external device to the single-mode optical fiber led from the optical device package.

6. The optical device package according to claim 5, wherein said optical devices are optical switches, whereby the optical device package acts as an optical switch package.

* * * * *